(12) United States Patent
Inae (10) Patent No.: US 12,549,863 B2
(45) Date of Patent: Feb. 10, 2026

(54) IMAGE PROCESSING CHANNELS HAVING COMMON OUTPUT

(71) Applicant: Renesas Electronics Corporation, Tokyo (JP)

(72) Inventor: Yuuji Inae, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 245 days.

(21) Appl. No.: 18/540,643

(22) Filed: Dec. 14, 2023

(65) Prior Publication Data

US 2024/0205550 A1    Jun. 20, 2024

(30) Foreign Application Priority Data

Dec. 15, 2022 (JP) .................. 2022-200210

(51) Int. Cl.
*H04N 23/80* (2023.01)
*H04N 23/741* (2023.01)

(52) U.S. Cl.
CPC ........... *H04N 23/80* (2023.01); *H04N 23/741* (2023.01)

(58) Field of Classification Search
None
See application file for complete search history.

(56) References Cited

U.S. PATENT DOCUMENTS

| | | | | |
|---|---|---|---|---|
| 4,698,666 A | * | 10/1987 | Lake, Jr. | H04N 5/2622 348/E5.052 |
| 2006/0274964 A1 | * | 12/2006 | Isaka | G06T 1/20 382/276 |
| 2012/0081372 A1 | * | 4/2012 | Sasaki | G06T 1/20 345/502 |
| 2014/0078392 A1 | * | 3/2014 | Dachiku | H04N 21/23406 348/441 |

FOREIGN PATENT DOCUMENTS

| | | |
|---|---|---|
| JP | 2011-59911 A | 3/2011 |
| JP | 2019016014 A * | 1/2019 |

* cited by examiner

*Primary Examiner* — Paul M Berardesca
(74) *Attorney, Agent, or Firm* — Rimon P.C.

(57) ABSTRACT

Reducing the increase in circuit area when processing images in each channel. Providing an image processing device that includes an input part for inputting images, an image processing part included in the first channel, an image processing part included in the second channel, a control part that delays the output from the second channel for a time corresponding to the processing time of the first channel and the processing time of the second channel, and an output part that outputs the output from the first channel and the output from the second channel in a first-in-first-out manner.

9 Claims, 7 Drawing Sheets

IMAGE PROCESSING CHANNELS HAVING COMMON OUTPUT

CROSS-REFERENCE TO RELATED APPLICATIONS

The disclosure of Japanese Patent Application No. 2022-200210 filed on Dec. 15, 2022, including the specification, drawings and abstract is incorporated herein by reference in its entirety.

BACKGROUND

This disclosure relates to an image processing device, an image processing method, and an information processing device.

Conventionally, an image processing device configuration has been known in which multiple image processing units are connected, and image processing units that do not need to be processed can be bypassed, and images captured (acquired) by an image sensor are processed by each image processing unit, and the processed images are written to memory via a bus (for example, see [Patent Document 1]).

There are disclosed techniques listed below.

[Patent Document 1] Japanese Unexamined Patent Application Publication No. 2011-059911

SUMMARY

To realize HDR (High Dynamic Range), etc., we will consider the case where multiple processing paths are provided on an image processing device including one or more image processing units, and images such as those captured by an image sensor are processed in each path.

In this case, in the conventional technology, for example, there is a problem that the area of the circuit increases. Other objects and novel features will become apparent from the description of this specification and the accompanying drawings.

In one embodiment of the present disclosure, an image processing device is provided that includes an input unit that inputs an image, an image processing unit included in a first channel, an image processing unit included in a second channel, a control unit that delays an output from the second channel for a time corresponding to the processing time of the first channel and the processing time of the second channel, and an output unit that outputs an output from the first channel and an output from the second channel in a first-in-first-out manner.

In another embodiment of the present disclosure, an image processing method is provided in which an image processing device inputs an image, delays an output from the second channel for a time corresponding to the processing time of an image processing unit included in the first channel and the processing time of an image processing unit included in the second channel, and outputs an output from the first channel and an output from the second channel in a first-in-first-out manner.

In another embodiment of the present disclosure, an information processing device is provided that includes an image sensor, an image processing device, and a processor, wherein the image processing device includes an input unit that inputs an image from the image sensor, an image processing unit included in a first channel, an image processing unit included in a second channel, a control unit that delays an output from the second channel for a time corresponding to the processing time of the first channel and the processing time of the second channel, and an output unit that outputs an output from the first channel and an output from the second channel to the processor in a first-in-first-out manner.

According to one aspect, it is possible to reduce the increase in the area of the circuit when processing images in each channel.

DETAILED DESCRIPTION

The principles of this disclosure are explained with reference to several exemplary embodiments. These embodiments are described for illustrative purposes only, without suggesting any limitation on the scope of this disclosure, and it is understood that they assist those skilled in the art in understanding and implementing this disclosure. The disclosure described in this specification can be implemented in various ways other than those described below.

In the following description and in the claims, unless otherwise defined, all technical and scientific terms used in this specification have the same meaning as generally understood by those skilled in the art to which this disclosure belongs.

Hereinafter, embodiments of this disclosure will be described with reference to the drawings.

(FIRST EMBODIMENT)

<Configuration>

Figure 1:
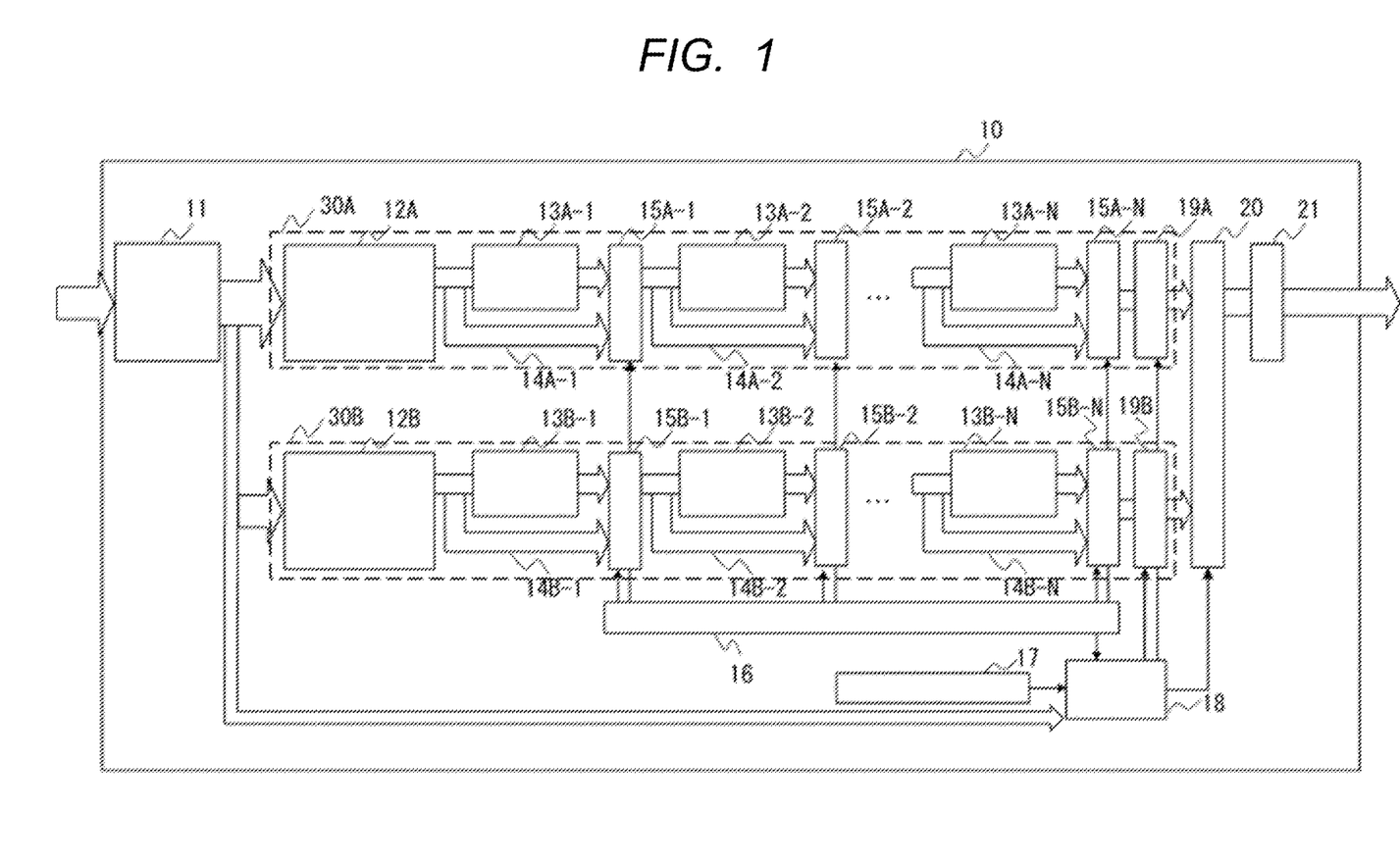
FIG. 1 is a diagram showing an example of the configuration of an image processing device according to the first embodiment.

Referring to FIG. 1, the configuration of an image processing device 10 according to the first embodiment will be described. FIG. 1 is a diagram showing an example of the configuration of the image processing device 10 according to the first embodiment.

The image processing device 10 has an input part 11. The image processing device 10 also has data selectors 12A and 12B (hereinafter, when there is no need to distinguish, they are also appropriately referred to as "data selector 12"). The image processing device 10 also has image processing parts 13A-1, 13A-2, . . . , 13A-N, image processing parts 13B-1, 13B-2, . . . , 13B-N (hereinafter, when there is no need to distinguish, they are also appropriately referred to as "image processing part 13"). Note that N is any integer (natural number) of 1 or more.

The image processing device 10 also has bypasses 14A-1, 14A-2, . . . 14A-N, bypasses 14B-1, 14B-2, 14B-N (hereinafter, when there is no need to distinguish, they are also appropriately referred to as "bypass 14"). The image processing device 10 also has selectors 15A-1, 15A-2, . . . , 15A-N, selectors 15B-1, 15B-2, , 15B-N (hereinafter, when there is no need to distinguish, they are also appropriately referred to as "selector 15").

The image processing device 10 also has an initial setting register 16, a delay setting register 17, and a control part 18. The image processing device 10 also has timing adjustment parts 19A and 19B (hereinafter, when there is no need to distinguish, they are also appropriately referred to as "timing adjustment part 19"). The image processing device 10 also has a selector 20 and an output part 21.

Data selector 12A, image processing parts 13A-1, 13A-2, . . . , 13A-N, bypasses 14A-1, 14A-2, , 14A-N, selectors 15A-1, 15A-2, . . . , 15A-N, and timing adjustment part 19A form a channel (processing path, image processing module) 30A that processes images in a series of paths. Data selector 12B, image processing parts 13B-1, 13B-2, . . . , 13B-N, bypasses 14B-1, 14B-2, . . . , 14B-N, selectors 15B-1, 15B-2, 15B-N, and timing adjustment part 19B form a channel 30B that processes images in a series of paths. In the example of FIG. 1, the number of channels is two, but this disclosure is not limited to this. The number of channels may be any number (for example, 4, 8, etc.).

In the example of FIG. 1, in channel 30A, an image processing unit 13A-1 and a bypass 14A-1 are connected downstream of the data selector 12A. Then, a selector 15A-1 is connected downstream of the image processing unit 13A-1 and the bypass 14A-1. Then, sets of the image processing unit 13A-i, the bypass 14A-i, and the selector 15A-i are connected in a repeating manner from i=2 to N-1. Then, a timing adjustment unit 19A is connected downstream of the selector 15A-N.

In the example of FIG. 1, channel 30B has the same configuration as channel 30A. Therefore, in the description of channel 30B, it is sufficient to replace "A" with "B" in the description of channel 30A. Also, a selector 20 is connected downstream of the timing adjustment units 19A and 19B, and an output unit 21 is connected downstream of the selector 20.

The input unit 11, for example, acquires image data captured by an image sensor (camera) as data compliant with the MIPI (Mobile Industry Processor Interface) standard, and outputs it to the data selectors 12A and 12B. The input unit 11 may acquire image data in which data with different VC (Virtual Channel) and DT (Data Type) are time-division multiplexed in accordance with the MIPI CSI-2 (Camera Serial Interface-2) standard.

In this case, the input unit 11, for example, to achieve HDR (High Dynamic Range) to prevent white clipping and black crushing, may acquire the first image data at VC0 (Virtual Channel 0, an example of the "first virtual channel") and the second image data at VC1 (Virtual Channel 1, an example of the "second virtual channel"). White clipping and black crushing are phenomena where the color of pixels in areas that exceed the minimum or maximum intensity that can be expressed digitally in images captured by the image sensor is recorded as white or black. White clipping is, for example, when the exposure is adjusted to relatively dark areas such as indoors, the color of pixels in relatively bright areas visible from the window is recorded as white. Black crushing is, for example, when the exposure is adjusted to relatively bright areas visible from the window, the color of pixels in relatively dark areas such as indoors is recorded as black.

The data selector 12 determines whether to output the image data to the downstream image processing unit 13 or the bypass 14 based on the data such as VC (Virtual Channel), DT (Data Type) , etc. included in the data received from the input unit 11 and the data recorded in the initial setting register 16, and outputs to the determined destination.

Each data selector 12 may output only the image data of the VC corresponding to the data recorded in each data selector 12 and the initial setting register 16 to the downstream. In this case, for example, the data selector 12A may output the image data of VC0 (Virtual Channel 0) to the downstream, and the data selector 12B may output the image data of VC1 (Virtual Channel 1) to the downstream. As a result, in channel 30A, the image data of virtual channel 0 is processed, and in channel 30B, the image data of virtual channel 1 is processed. Therefore, for example, it is possible to process an image in which a relatively dark area such as indoors is clearly depicted in channel 30A, and an image in which a relatively bright area visible from the window is clearly depicted in channel 30B. Therefore, a device (information processing device 1 to be described later) having the image processing device 10 can generate image data in which both relatively bright areas and relatively dark areas are clearly depicted based on each image data output from each channel by performing image processing such as synthesis.

The image processing unit 13, for example, performs specific image processing on the input image data and outputs it to the downstream selector 15. The bypass 14 outputs the input image data as it is (without performing specific image processing) to the downstream selector 15.

The selector 15 determines whether to output to the subsequent image processing unit 13 or the bypass 14 based on the data recorded (set, registered) in the initial setting register 16. The selector 15 then outputs the image data received from the preceding image processing unit 13 or the bypass 14 to the determined subsequent output destination.

In the initial setting register 16, for example, information specifying whether to output to the subsequent image processing unit 13 or the bypass 14 based on instructions from applications etc. of the device equipped with the image processing device 10 is recorded for each selector 15.

In the delay setting register 17, information corresponding to the processing time of each channel is recorded. For example, the required time for each processing of each image processing unit 13 included in each channel may be recorded in the delay setting register 17 at the time of factory shipment etc.

Also, in the delay setting register 17, for example, the total required time for processing by the image processing unit 13 for each channel, calculated based on the information recorded in the initial setting register 16, may be recorded. In this case, in the delay setting register 17, for example, a value calculated based on the data set in the initial setting register 16 may be recorded by the control unit 18 when the data is set in the initial setting register 16.

The control unit 18 identifies the delay amount of at least one of the channels 30A and 30B based on the information recorded in the delay setting register 17, which indicates the processing time of the channel 30A and the processing time of the channel 30B. Then, the control unit 18 delays the output from at least one of the channels 30A and 30B at the timing adjustment unit 19.

The control unit 18 may be implemented by hardware or a dedicated circuit, software, logic, or any combination thereof. Some embodiments that realize the function of the control unit 18 may be implemented by hardware, while other embodiments may be implemented by firmware or software that can be executed by a controller, microprocessor, or other computing device.

The selector 20 switches the input source timing adjustment unit 19 based on the instruction from the control unit 18. Also, the selector 20 outputs the image data received from the timing adjustment unit 19 to the output unit 21.

The output unit 21 outputs the image data output from each channel to the device having the image processing device 10 via a bus complying with a specific standard (for example, AXI, Advanced extensible Interface) in a first-in, first-out (FIFO, First In, First Out) manner.

In the example of FIG. 1, the timing adjustment unit 19 is connected to the subsequent stage of the most downstream selector 15 in each channel, but this disclosure is not limited to this. The timing adjustment unit 19 according to the present embodiment may be connected to the preceding or subsequent stage of any device (for example, data selector 12, or selector 15) in each channel.

<Operation (Processing) of Control Unit 18>

Figure 2:
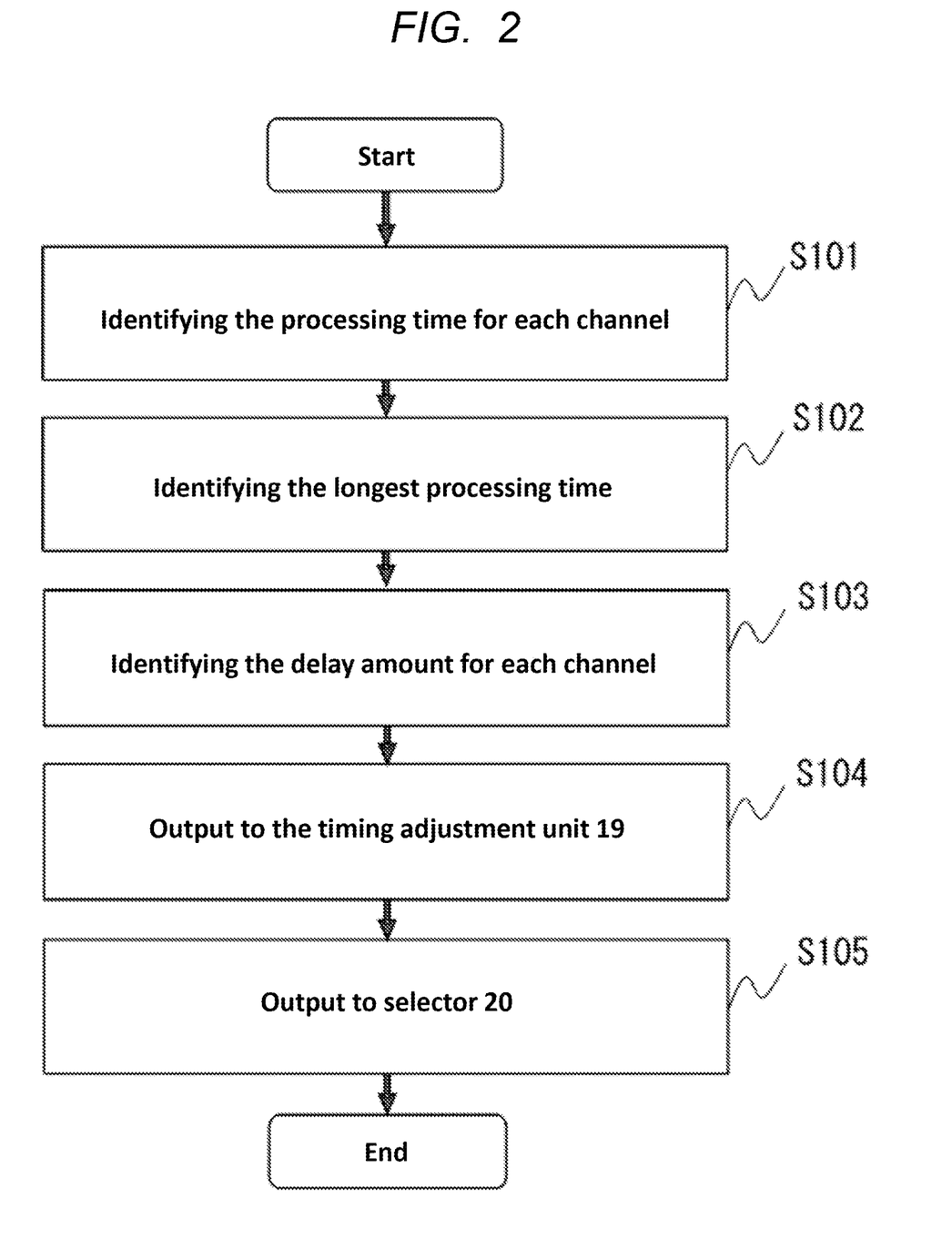
FIG. 2 is a flowchart showing an example of the processing of the control part according to the first embodiment.

Next, referring to FIG. 2, an example of the processing of the control unit 18 according to the first embodiment will be described. FIG. 2 is a flowchart showing an example of the processing of the control unit 18 according to the first embodiment. The processing of FIG. 2 may be performed, for example, each time one image data is input to the input unit 11.

In step S101, the control unit 18 identifies the processing time of each channel. Here, the control unit 18 may, for example, obtain the total required time for processing by the image processing unit 13 for each channel from the delay setting register 17.

Furthermore, the control unit 18 may calculate the total processing time required by the image processing unit 13 for each channel based on the information recorded in the initial setting register 16 and the processing time required by the image processing unit 13 recorded in the delay setting register 17. In this case, the control unit 18 may identify the sum of the processing times of each image processing unit 13 that is not bypassed by the data selector 12 or each selector 15 included in one channel as the processing time for that channel.

Next, the control unit 18 identifies the longest processing time among the processing times of each channel (step S102).

Next, the control unit 18 identifies (determines, calculates) the value obtained by subtracting the processing time of each channel from the longest processing time as the delay amount for each channel (step S103). Let the processing time of channel 30A be TA and the processing time of channel 30B be TB and assume that TA>TB. In this case, the delay amount of channel 30A is identified as 0 (=TA-TA), and the delay amount of channel 30B is identified as TA-TB.

Next, the control unit 18 outputs information indicating the delay amount for each channel to the timing adjustment unit 19 of each channel (step S104). As a result, the timing adjustment unit 19 of a certain channel delays the output (input to the selector 20) from that channel by the delay amount specified for that channel.

Next, the control unit 18 outputs information indicating the longest processing time among the processing times of each channel to the selector 20 (step S105). As a result, the selector 20 switches the timing adjustment unit 19 to be inputted for each specified time. In this case, for example, the selector 20 accepts input from the timing adjustment unit 19A and outputs to the output unit 21 until time TA has passed since one image data was input to the input unit 11, and thereafter accepts input from the timing adjustment unit 19B and outputs to the output unit 21.

(Other)

Consider the case where multiple processing paths, each with multiple image processing units connected in series, are provided in conventional technology, and image processing is performed on different processing paths (actual channels) for each virtual channel such as MIPI. In this case, for example, there is a problem that the area of the circuit increases.

Therefore, by sharing (commonizing) the output unit with a relatively large area for FIFO memory and bus output function in multiple processing paths, the area is reduced. In this case, at least a part of the image data output from each processing path may collide due to the processing delay in each processing path. In this case, the data that has collided cannot be output from the FIFO memory of the output unit and disappears.

According to the technology disclosed in this document, the output from at least one or more channels is delayed for a time corresponding to the processing time of each channel. Therefore, collisions in the FIFO memory of the output unit 21 can be avoided (prevented, reduced). Therefore, the output unit 21 can be shared by each channel. Therefore, the increase in the area of the circuit of the image processing device 10 when processing images in each channel can be reduced.

(Second Embodiment)

In the first embodiment, each channel 30A, 30B has its own image processing unit 13. In the second embodiment, at least a part of the image processing unit 13 is shared by each channel 30A, 30B. According to the second embodiment, compared to the first embodiment, increase in the area of the image processing device 10 can be further reduced by sharing at least a part of the image processing unit 13. The following mainly explains the points different from the first embodiment in the second embodiment.

<Configuration>

Figure 3:
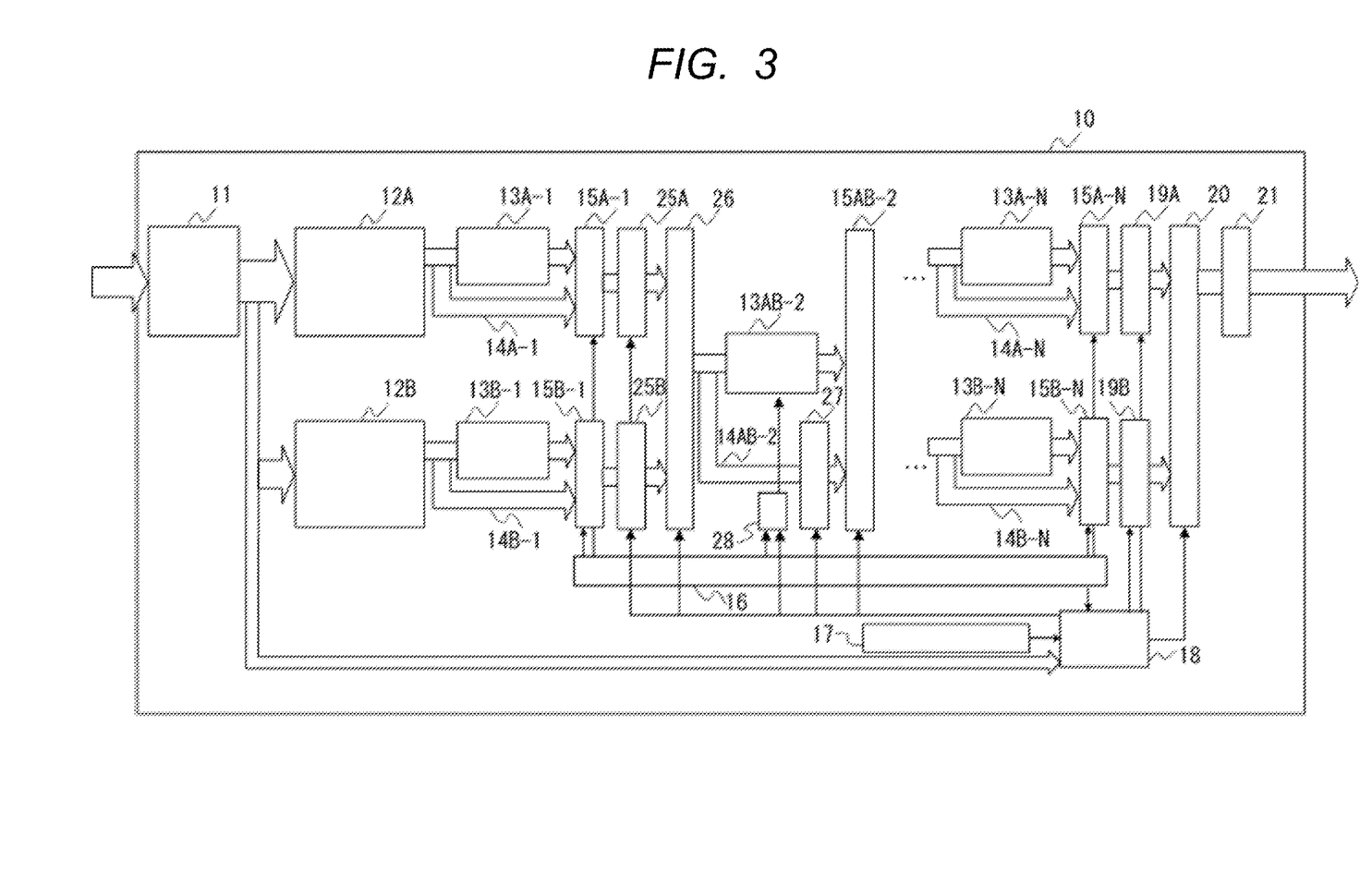
FIG. 3 is a diagram showing an example of the configuration of an image processing device according to the second embodiment.

Referring to FIG. 3, an explanation will be given of the configuration of the image processing device 10 according to the second embodiment. FIG. 3 is a diagram showing an example of the configuration of the image processing device 10 according to the second embodiment. In the example of FIG. 3, the second stage image processing unit 13 according to the first embodiment is shared. This disclosure is not limited to this example. The image processing unit 13 to be shared (hereinafter, appropriately referred to as "shared image processing unit 13") may be one or more from the first stage to the Nth stage.

The image processing unit 13 to be shared may be an image processing unit 13 that performs image processing that can be processed on a line-by-line basis of the image, such as color space conversion, linear matrix, etc. Also, the non-shared (individual for each channel) image processing unit 13 may be an image processing unit 13 that performs image processing that cannot be processed on a line-by-line basis of the image, such as image clipping, demosaicing, etc.

In the example of FIG. 3, the image processing device 10 according to the second embodiment differs from the image processing device 10 according to the first embodiment shown in FIG. 1 in that it has a shared image processing unit 13AB-2, a bypass 14AB-2, and a parameter selector 28 instead of the image processing units 13A-2, 13B-2, bypasses 14A-2, 14B-2. It also differs in that it has a selector 15AB-2 instead of selectors 15A-2, 15B-2. It also differs in that it has a timing adjustment unit 25A after the selector 15A-1, and a timing adjustment unit 25B after the selector 15B-1. It also differs in that it has a selector 26 after the timing adjustment units 25A, 25B, and a timing adjustment unit 27 after the bypass 14AB-2.

This allows to avoid data loss due to data collision before the shared image processing unit 13AB-2 and data loss due to data collision after the shared image processing unit 13AB-2.

The parameter selector 28 switches the parameters for image processing used by the shared image processing unit 13 at a timing based on instructions from the control unit 18, based on the information recorded in the initial setting register 16.

In the example of FIG. 3, the timing adjustment units 25A, 25B are each connected after the selectors 15A-1, 15A-2, but this disclosure is not limited to this. The timing adjustment units 25A, 25B according to this embodiment may be connected at any location from the front stage of the head device (data selector 12) in each channel to the front stage of the selector before the shared image processing unit 13 when there is one shared image processing unit 13.

Also, when there are multiple shared image processing units 13, the timing adjustment unit for the head shared image processing unit 13 among the multiple shared image processing units 13 may be connected at any location from the front stage of the head device (data selector 12) in each channel to the front stage of the selector before the shared image processing unit 13. And, the timing adjustment unit for one shared image processing unit 13 other than the head among the multiple shared image processing units 13 may be connected at any location from the back stage of the selector after the other shared image processing unit 13 at a more front stage in each channel to the front stage of the selector before the one shared image processing unit 13.

<Processing (Operation)>

Figure 4:
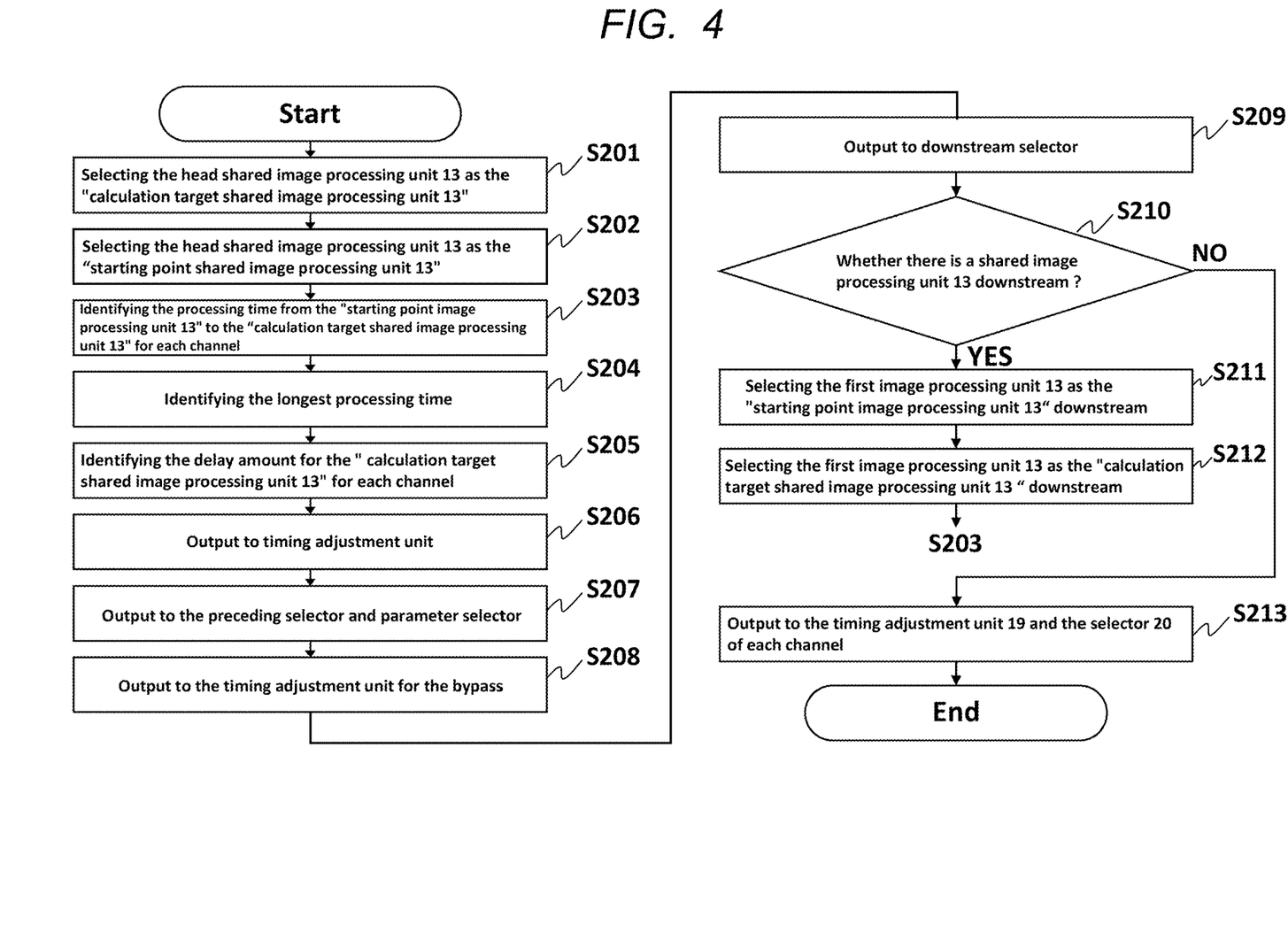
FIG. 4 is a flowchart showing an example of the processing of the control part according to the second embodiment.

Next, referring to FIG. 4, an explanation will be given of an example of the processing of the control unit 18 according to the second embodiment. FIG. 4 is a flowchart showing an example of the processing of the control unit 18 according to the second embodiment. The processing of FIG. 4 may be performed each time one image data is input to the input unit 11, for example.

In step S201, the control unit 18 selects the head shared image processing unit 13 among the multiple shared image processing units 13 as the "calculation target shared image processing unit 13". Then, the control unit 18 selects the head image processing unit 13 in each channel as the "start point image processing unit 13" (step S202).

Next, the control unit 18 identifies the processing time from the "starting point image processing unit 13" to the "target shared image processing unit 13" for each channel (step S203). Here, the control unit 18 may calculate the total required time for the process from the "starting point image processing unit 13" to the "target shared image processing unit 13" based on the information recorded in the initial setting register 16 and the required time for the process of each image processing unit 13 recorded in the delay setting register 17. In this case, the control unit 18 may identify the sum of the required times for the process of each image processing unit 13 that is not bypassed from the "starting point image processing unit 13" to the "target shared image processing unit 13" as the processing time from the "starting point image processing unit 13" to the "target shared image processing unit 13".

Also, the control unit 18 may retrieve the processing time from the "starting point image processing unit 13" to the "target shared image processing unit 13" that has been previously calculated and recorded from the delay setting register 17.

Next, the control unit 18 identifies the longest processing time among the processing times from the "starting point image processing unit 13" to the "target shared image processing unit 13" for each channel (step S204).

Next, the control unit 18 identifies (determines, calculates) the delay amount for the "target shared image processing unit 13" for each channel by subtracting the processing time from the "starting point image processing unit 13" to the "target shared image processing unit 13" for each channel from the longest processing time (step S205).

Next, the control unit 18 outputs information indicating the delay amount for the input to the "target shared image processing unit 13" for each channel to the timing adjustment unit for the "target shared image processing unit 13" for each channel (step S206). As a result, each timing adjustment unit delays the output (input to the selector) to the subsequent selector by the specified delay time.

The timing adjustment unit for the "target shared image processing unit 13" is a timing adjustment unit provided between the "starting point image processing unit 13" and the "target shared image processing unit 13". In the example of FIG. 3, the timing adjustment units for the shared image processing unit 13AB-2 are timing adjustment units 25A and 25B.

Next, the control unit 18 outputs information indicating the longest processing time among the processing times from the "starting point image processing unit 13" to the "target shared image processing unit 13" for each channel to the selector before the "target shared image processing unit 13" and the parameter selector of the "target shared image processing unit 13" (step S207). As a result, the selector switches the target timing adjustment unit for each specified time. Also, the parameter selector switches the image processing parameters used by the "target shared image processing unit 13" for each specified time. In the example of FIG. 3, the selector before the shared image processing unit 13AB-2 is selector 26, and the parameter selector of the shared image processing unit 13AB-2 is parameter selector 28.

Next, the control unit 18 outputs information indicating the delay amount for the bypass of the "target shared image processing unit 13" for each channel to the timing adjustment unit for the bypass of the "target shared image processing unit 13" for each channel (step S208). As a result, the timing adjustment unit for the bypass of the "target shared image processing unit 13" delays the output (input to the selector) to the subsequent selector by the specified delay time.

Here, the control unit 18 may determine, for example, based on the information recorded in the initial setting register 16, whether there are channels that do not bypass the "calculation target shared image processing unit 13" and channels that do bypass. If there are no channels that bypass and channels that do not bypass (all channels bypass or all channels do not bypass), the delay amount for the bypass of the "calculation target shared image processing unit 13" in each channel may be set to 0.

On the other hand, if there are channels that do not bypass and channels that do bypass, the processing time at the "calculation target shared image processing unit 13" may be used as the delay amount for the bypass of the "calculation target shared image processing unit 13" in the channels that do bypass.

Next, the control unit 18 outputs information indicating the processing time at the "calculation target shared image processing unit 13" to the selector downstream of the "calculation target shared image processing unit 13" (step S209). As a result, the selector switches the input target from among the "calculation target shared image processing unit 13" and the timing adjustment unit at specified times. In the example of FIG. 3, the selector downstream of the shared image processing unit 13AB-2 is the selector 15AB-2.

Next, the control unit 18 determines whether there is a shared image processing unit 13 downstream of the "calculation target shared image processing unit 13" (step S210).

If there is a shared image processing unit 13 downstream of the "calculation target shared image processing unit 13" (YES in step S210), the control unit 18 selects the first image processing unit 13 among the image processing units 13 downstream of the "calculation target shared image processing unit 13" as the "starting point image processing unit 13" (step S211).

Next, the control unit 18 selects the first shared image processing unit 13 among the shared image processing units 13 downstream of the "calculation target shared image processing unit 13" as the "calculation target shared image processing unit 13" (step S212), and proceeds to the processing of step S203.

On the other hand, if there is no shared image processing unit 13 downstream of the "calculation target shared image processing unit 13" (NO in step S210), the control unit 18 outputs to the timing adjustment unit 19 and the selector 20 of each channel (step S213), and ends the processing. The processing of step S213 may be read as, for example, "processing time of each channel" and "processing time of each image processing unit 13 downstream of the calculation target shared image processing unit 13".

(Third Embodiment)

In the first and second embodiments, the combination of the image processing unit 13, the bypass 14, the selector 15, and the timing adjustment unit (for example, the image processing units 13A-N, the bypass 14A-N, the selectors 15A-N, and the timing adjustment unit 19A in FIGS. 1 and 3. Image processing units 13B-N, bypass selectors 14B-N, 15B-N, and timing adjustment unit 19B. Image processing unit 13A-1, bypass 14A-1, selector 15A-1, and timing adjustment unit 25A in FIG. 3. Image processing unit 13B-1, bypass 14B-1, selector 15B-1, and timing adjustment unit 25B.) was explained.

In the third embodiment, an example of sharing a flip-flop between the image processing unit 13 and the timing adjustment unit in the combination is explained. According to the third embodiment, compared to the first and second embodiments, at least some of the flip-flops are shared, which can further reduce the increase in the area of the image processing device 10.

Below, mainly the points different from the first or second embodiment in the third embodiment are explained. The configurations of each embodiment can be appropriately combined.

<Configuration>

Figure 5:
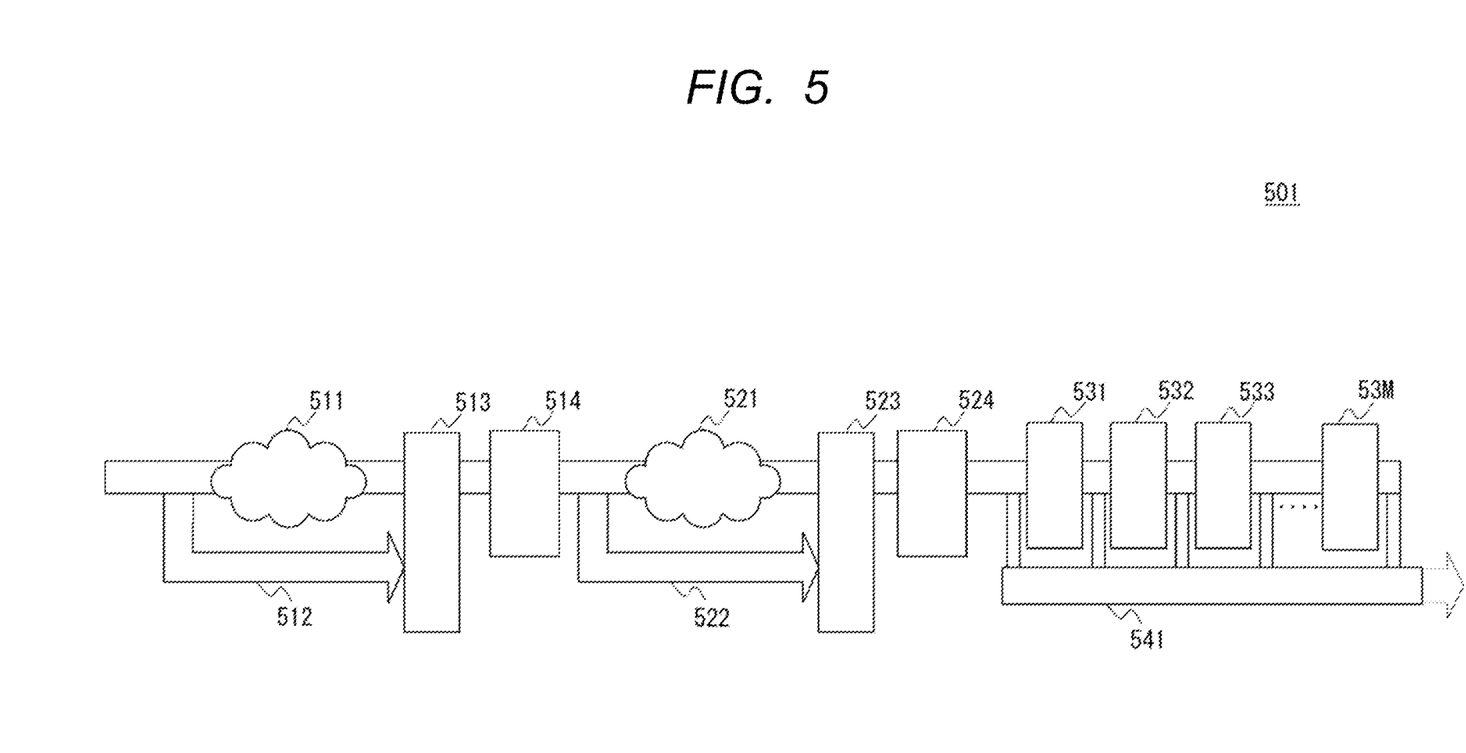
FIG. 5 is a diagram showing an example of the configuration of a combination of an image processing part, a bypass, a selector, and a timing adjustment part according to the third embodiment.

Referring to FIG. 5, an example of the configuration of a combination of an image processing unit 13, a bypass 14, a selector 15, and a timing adjustment unit according to the third embodiment (Example 1) will be described.

FIG. 5 is a diagram showing an example of the configuration of a combination of an image processing unit 13, a bypass 14, a selector 15, and a timing adjustment unit according to the third embodiment.

In the example of FIG. 5, an image processing device (equivalent image processing device) equivalent to the combination of the image processing units 13A-N, bypasses 14A-N, selectors 15A-N, and timing adjustment units 19A, etc., shown in FIGS. 1 and 3, is realized.

In the example of FIG. 5, the equivalent image processing device 501 includes an arithmetic unit 511, a bypass 512, a selector 513, a flip-flop 514, an arithmetic unit 521, a bypass 522, a selector 523, a flip-flop 524, flip-flops 531, 532, 533, . . . , 53M, and a selector 541.

In the example of FIG. 5, a selector 513 is connected to the rear stage of the arithmetic unit 511 and the bypass 512, and a flip-flop 514 is connected to the rear stage of the selector 513.

Then, the arithmetic unit 521 and the bypass 522 are connected to the rear stage of the flip-flop 514.

A selector 523 is connected to the rear stage of the arithmetic unit 521 and the bypass 522, and a flip-flop 524 is connected to the rear stage of the selector 523.

Then, flip-flops 531, 532, 533, . . . , 53M are sequentially connected to the rear stage of the flip-flop 524, and each of the flip-flops 531, 532, 533, . . . , 53M is connected so that it can be bypassed by the selector 541.

The number of combinations of the arithmetic unit 511, the bypass 512, the selector 513, and the flip-flop 514 is not limited to the example of FIG. 5.

The arithmetic units 511 and 521 are image processing devices that perform each of the multiple operations performed by the image processing unit 13.

When image processing by the image processing unit 13 is performed, the arithmetic units 511 and 521 are not bypassed. When image processing by the image processing unit 13 is not performed due to the bypass 14, the arithmetic units 511 and 521 are bypassed by the bypass 512 and the bypass 522.

The flip-flop 514 temporarily holds one of the calculation results by the arithmetic unit 511 and the received data from the bypass 512 and then outputs it to the subsequent stage.

Also, the flip-flop 524 temporarily holds one of the calculation results by the arithmetic unit 521 and the received data from the bypass 522 and then outputs it to the subsequent stage.

The control unit 18 may calculate a value (delay amount) by subtracting the time during which data is temporarily held in the flip-flops 514 and 524 from the delay amount instructed to the timing adjustment unit explained in the first or second embodiment.

Then, the control unit 18 may output an instruction to delay the output for a time corresponding to the calculated value to the selector 541.

The selector 541 may bypass at least one of the flip-flops 531, 532, 533, . . . , 53M according to the delay amount specified by the control unit 18.

This allows the flip-flops 514 and 524 to be shared between the image processing unit 13 and the timing adjustment unit.

<Configuration>

Figure 6:
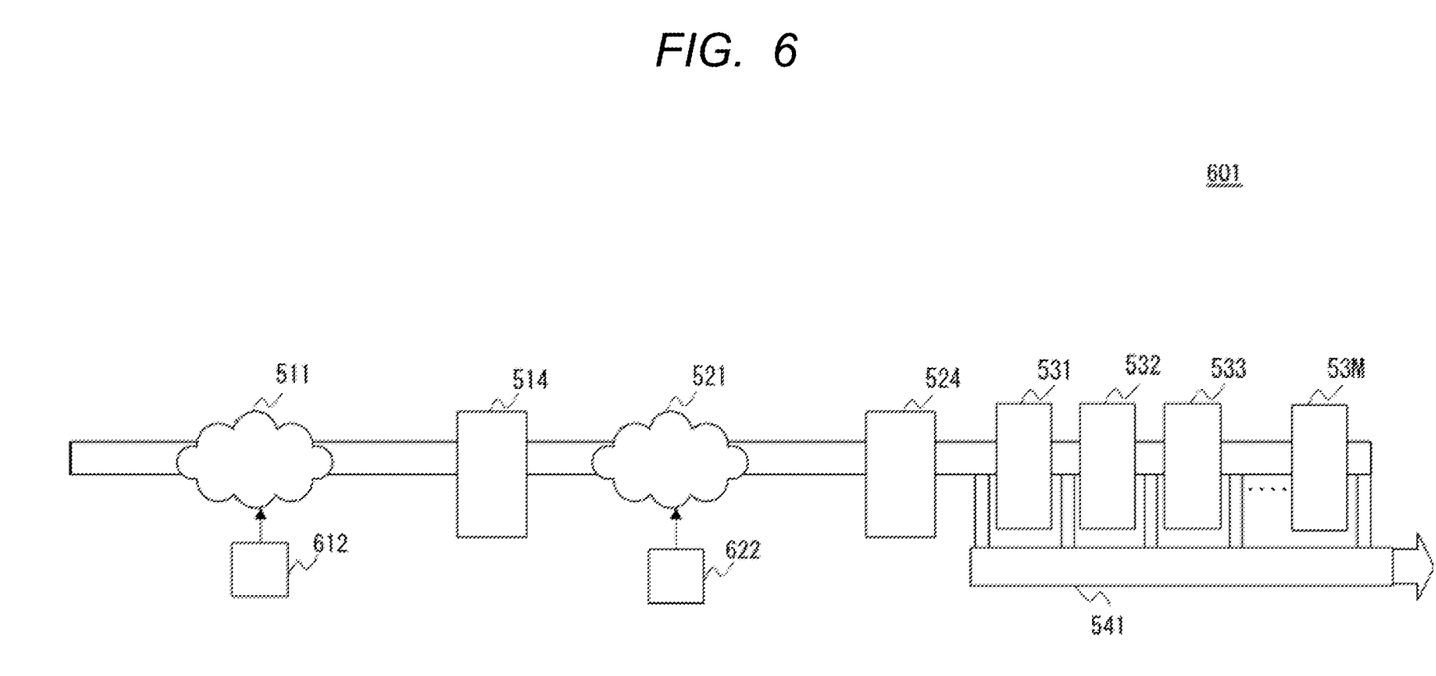
FIG. 6 is a diagram showing an example of the configuration of a combination of an image processing part, a bypass, a selector, and a timing adjustment part according to the third embodiment.

Referring to FIG. 6, an example of the configuration of a combination of an image processing unit 13, a bypass 14, a selector 15, and a timing adjustment unit according to the third embodiment (Example 2) will be described.

FIG. 6 is a diagram showing an example of the configuration of a combination of an image processing unit 13, a bypass 14, a selector 15, and a timing adjustment unit according to the third embodiment.

In the example of FIG. 6, as in the example of FIG. 5, an image processing device (equivalent image processing device) equivalent to the combination of the image processing units 13A-N, bypasses 14A-N, selectors 15A-N, and timing adjustment units 19A, etc., shown in FIGS. 1 and 3, is realized.

In the following, the same reference numerals are used for the same configurations as in FIG. 5, and redundant descriptions are omitted.

In the example of FIG. 6, the equivalent image processing device 601 includes an arithmetic unit 511, a parameter setting unit 612, a flip-flop 514, an arithmetic unit 521, a parameter setting unit 622, a flip-flop 524, flip-flops 531, 532, 533, . . . 53M, and a selector 541. In the example of FIG. 6, the flip-flop 514 is connected to the rear stage of the arithmetic unit 511. Then, the arithmetic unit 521 is connected to the rear stage of the flip-flop 514. The flip-flop 524 is connected to the rear stage of the arithmetic unit 521. The number of combinations of the arithmetic unit 511, the parameter setting unit 612, and the flip-flop 514 is not limited to the example of FIG. 5.

When image processing is performed by the image processing unit 13, specific parameters for image processing are set in the arithmetic units 511 and 521 by the parameter setting units 612 and 622, respectively. On the other hand, when image processing is not performed by the image processing unit 13 due to the bypass 14, specific parameters for the bypass are set in the arithmetic units 511 and 521 by the parameter setting units 612 and 622, respectively.

The parameter setting units 612 and 622 may, for example, set "1" as a parameter for the bypass when the operation in the arithmetic units 511 and 521 is multiplication, so that logically, no operation is performed. Also, the parameter setting units 612 and 622 may, for example, set "0" to be added as a parameter for the bypass when the operation in the arithmetic units 511 and 521 is addition, so that logically, no operation is performed.

(Regarding the Information Processing Device)

Figure 7:
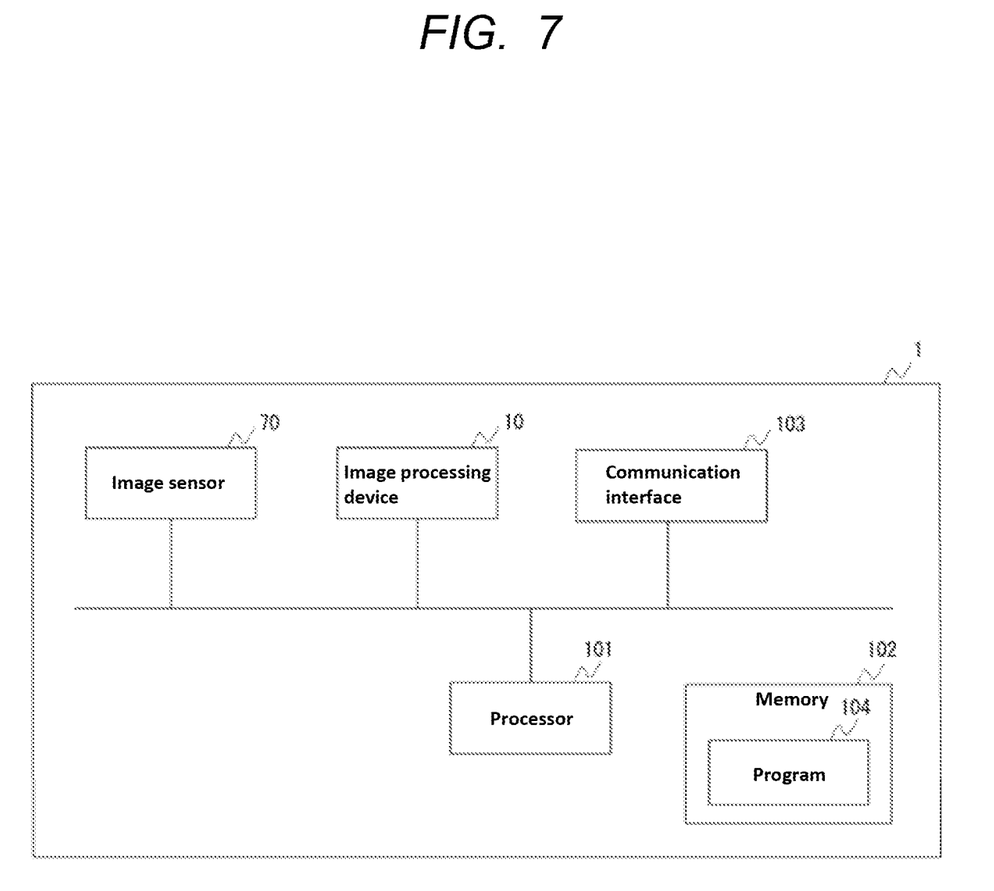
FIG. 7 is a diagram showing an example of the configuration of an information processing device 1 according to the embodiment.

FIG. 7 is a diagram showing an example of the configuration of the information processing device 1 according to the embodiment. In the example of FIG. 7, the information processing device 1 includes an image sensor 70, an image processing device 10, a processor 101, a memory 102, and a communication interface 103. These parts may be connected by a bus or the like. The memory 102 stores at least a part of the program 104. The communication interface 103 includes an interface necessary for communication with other network elements.

When the program 104 is executed by the cooperation of the processor 101 and the memory 102, etc., at least a part of the processing of the embodiment disclosed herein is performed by the information processing device 1. The memory 102 may be of any type suitable for a local technical network. The memory 102 may be, as a non-limiting example, a non-temporary computer-readable storage medium. Also, the memory 102 may be implemented using any appropriate data storage technology, such as semiconductor-based memory devices, magnetic memory devices and systems, optical memory devices and systems, fixed memory, and removable memory. Although only one memory 102 is shown in the information processing device 1, the information processing device 1 may have several physically different memory modules. The processor 101 may be of any type. The processor 101 may include one or more of a general-purpose computer, a dedicated computer, a microprocessor, a digital signal processor (DSP), and a processor based on a multicore processor architecture, as a non-limiting example. The information processing device 1 may have multiple processors, such as a specific purpose integrated circuit chip that is temporally dependent on a clock that synchronizes the main processor.

The program can be stored using various types of non-transitory computer readable media and can be supplied to a computer. Non-transitory computer readable media includes various types of tangible storage media. Examples of non-transitory computer readable media include magnetic storage media, magneto-optical storage media, optical disc media, and semiconductor memories. Magnetic storage media include, for example, flexible disks, magnetic tapes, and hard disk drives.

Magneto-optical storage media include, for example, magneto-optical disks. Optical disc media include, for example, Blu-ray discs, CD (Compact Disc)-ROM (Read Only Memory), CD-R (Recordable), CD-RW (Rewritable), and the like. Semiconductor memories include, for example, solid state drives, mask ROMS, PROMs (Programmable ROM), EPROMS (Erasable PROM), flash ROMs, RAMs (random access memory), and the like. The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Processor 101 may generate an image, such as HDR, based on each image sequentially output from each channel of the image processing device 10. The information processing device 1 may be, for example, a smartphone, a tablet, a digital camera, a vehicle-mounted camera, an industrial or household robot, a moving body (for example, a vehicle) that performs automatic driving, and the like.

Although the invention made by the inventor has been specifically described based on the embodiment, the present invention is not limited to the embodiment already described, and it is needless to say that various modifications can be made without departing from the gist thereof.

What is claimed is:

1. An image processing device comprising:
an input part for inputting an image;
an image processing part included in a first channel;
an image processing part included in a second channel;

a control part for delaying an output from the second channel for a time corresponding to a processing time of the first channel and a processing time of the second channel; and an output part for outputting an output from the first channel and the output from the second channel in a first-in-first-out manner.

2. The image processing device according to claim 1, wherein the control part delays the output from the second channel for a time corresponding to a difference between the processing time of the first channel and the processing time of the second channel.

3. The image processing device according to claim 2, wherein the control part identifies the longest processing time among the processing time of the first channel and the processing time of the second channel, and identifies a value obtained by subtracting the processing time of each channel from the longest processing time as the delay amount for each channel.

4. The image processing device according to claim 1, further comprising, a common image processing part commonly included in the first channel and the second channel, wherein the control part inputs to the common image processing part after delaying the output from the second channel.

5. The image processing device according to claim 1, wherein a specific image processing part included in the second channel has an arithmetic part for performing arithmetic, a bypass for bypassing the arithmetic part, and a flip-flop for temporarily holding and then outputting one of arithmetic results by the arithmetic part and received data from the bypass, wherein the flip-flop outputs the received data from the bypass temporarily held when the specific image processing part is bypassed, and wherein the control part delays the output from the second channel for a time corresponding to the processing time of the first channel, the processing time of the second channel, and the time when data is held by the flip-flop.

6. The image processing device according to claim 1, wherein a specific image processing part included in the second channel has an arithmetic part for performing arithmetic, a parameter setting part for setting parameters for arithmetic to the arithmetic part, and a flip-flop for temporarily holding and then outputting an arithmetic result by the arithmetic part, wherein the parameter setting part sets a value that does not change data input to the arithmetic part by the arithmetic using the parameters when the specific image processing part is bypassed, as the parameters for arithmetic, and wherein the control part delays the output from the second channel for a time corresponding to the processing time of the first channel, the processing time of the second channel, and the time when data is held by the flip-flop.

7. The image processing device according to claim 1, wherein the input part acquires the image with data conforming to the MIPI (Mobile Industry Processor Interface) standard, wherein the first channel processes image data included in a first virtual channel (VC, Virtual Channel) included in the data conforming to the MIPI standard, and wherein the second channel processes image data of a second virtual channel included in the data conforming to the MIPI standard.

8. An image processing method in which for an image processing device having an image processing part included in a first channel and an image processing part included in a second channel comprising:

inputting an image;

delaying an output from the second channel for a time corresponding to a processing time of the image processing part included in the first channel and a processing time of the image processing part included in the second channel; and outputting an output from the first channel and the output from the second channel in a first-in-first-out manner.

9. An information processing device comprising an image sensor, an image processing device, and a processor, wherein the image processing device includes:

an input part for inputting an image from the image sensor, an image processing part included in a first channel, an image processing part included in a second channel, a control part for delaying an output from the second channel for a time according to the processing time of the first channel and the processing time of the second channel, and an output part for outputting an output from the first channel and the output from the second channel to the processor in a first-in-first-out manner.

* * * * *